US009300584B1

(12) United States Patent
Filsfils et al.

(10) Patent No.: US 9,300,584 B1
(45) Date of Patent: Mar. 29, 2016

(54) EXPANDED QUALITY OF SERVICE PROCESSING OF MULTIPROTOCOL LABEL SWITCHING (MPLS) PACKETS

(75) Inventors: Clarence Filsfils, Brussels (BE); John H. W. Bettink, San Jose, CA (US); David John Smith, Scotch Plains, NJ (US)

(73) Assignee: Cisco Technology, Inc., San Jose, CA (US)

( * ) Notice: Subject to any disclaimer, the term of this patent is extended or adjusted under 35 U.S.C. 154(b) by 95 days.

(21) Appl. No.: 13/431,528

(22) Filed: Mar. 27, 2012

(51) Int. Cl.
*H04L 12/26* (2006.01)
*H04L 12/801* (2013.01)
*H04L 12/723* (2013.01)

(52) U.S. Cl.
CPC ............... *H04L 47/10* (2013.01); *H04L 45/50* (2013.01)

(58) Field of Classification Search
None
See application file for complete search history.

(56) References Cited

U.S. PATENT DOCUMENTS

| | | | | |
|---|---|---|---|---|
| 7,826,482 | B1* | 11/2010 | Minei et al. ................... | 370/467 |
| 7,839,856 | B2* | 11/2010 | Sinha et al. ................... | 370/392 |
| 7,885,259 | B2* | 2/2011 | Filsfils ........................... | 370/389 |
| 7,889,739 | B2* | 2/2011 | Bitar .............................. | 370/392 |
| 8,345,700 | B2* | 1/2013 | Ait-Ameur ................... | 370/409 |
| 2003/0161264 | A1* | 8/2003 | Ho et al. ....................... | 370/229 |
| 2005/0007954 | A1* | 1/2005 | Sreemanthula et al. ....... | 370/229 |
| 2005/0094636 | A1* | 5/2005 | Lee et al. ...................... | 370/389 |
| 2007/0133559 | A1* | 6/2007 | Ko et al. ....................... | 370/395.21 |
| 2008/0304485 | A1* | 12/2008 | Sinha et al. ................... | 370/392 |
| 2009/0097490 | A1* | 4/2009 | Sanderson et al. ............ | 370/395.53 |
| 2009/0103555 | A1* | 4/2009 | Bitar .............................. | 370/413 |
| 2011/0149962 | A1* | 6/2011 | Ait-Ameur ................... | 370/392 |
| 2012/0195198 | A1* | 8/2012 | Regan .......................... | 370/235 |
| 2012/0250690 | A1* | 10/2012 | Suh et al. ...................... | 370/392 |
| 2013/0286885 | A1* | 10/2013 | Hwang et al. ................. | 370/252 |

OTHER PUBLICATIONS

Andersson et al., "MPLS EXP—bits definition," Mar. 10, 2008, draft-andersson-mpls-expbits-def-00.txt, The Internet Society, Reston, VA, USA (twelve pages).
Rosen et al., "Multiprotocol Label Switching Architecture," Jan. 2001, RFC 3031, http://datatracker.ietf.org/doc/rfc3031, The Internet Society, Reston, VA, USA (sixty-one pages).
Rosen et al., "MPLS Label Stack Encoding," Jan. 2001, RFC 3032, http://datatracker.ieff.org/doc/rfc3032, The Internet Society, Reston, VA, USA (twenty-three pages).
Le Faucheur et al., "Multi-Protocol Label Switching (MPLS) Support of Differentiated Services," May 2002, RFC 3270, http://datatracker.ieft.org/doc/rfc3270, The Internet Society, Reston, VA, USA (sixty-four pages).

(Continued)

*Primary Examiner* — Ian N Moore
*Assistant Examiner* — Phong La
(74) *Attorney, Agent, or Firm* — The Law Office of Kirk D. Williams

(57) ABSTRACT

In one embodiment, a packet switching device provides more than eight behavior aggregates of Quality of Service (QoS) processing based on a service type of a received Multiprotocol Label Switched (MPLS) packet and on a Traffic Class (TC) value extracted from a label of the MPLS packet. The service type is typically determined based on a forwarding equivalence class (FEC) associated with the MPLS packet. This service type may identify a service provided by a service provider and/or the type of packet traffic.

9 Claims, 4 Drawing Sheets

(56) References Cited

OTHER PUBLICATIONS

Davis et al., "Explicit Congestion Marking in MPLS," Jan. 2008, RFC 5129 http://datatracker.ietf.org/doc/rfc5129, The Internet Society, Reston, VA, USA (twenty-one pages).

Andersson et al., "Multiprotocol Label Switching (MPLS) Label Stack Entry: 'EXP' Field Renamed to 'Traffic Class' Field," Feb. 2009, RFC 5462, http://datatracker.ietf.org/doc/rfc5462, The Internet Society, Reston, VA, USA (nine pages).

\* cited by examiner

EXPANDED QUALITY OF SERVICE PROCESSING OF MULTIPROTOCOL LABEL SWITCHING (MPLS) PACKETS

TECHNICAL FIELD

The present disclosure relates generally to processing of packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Different types of communications services are provided over a packet network. It is important to reliably and appropriately process and communicate packets across a packet network to support these different types of communications services.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
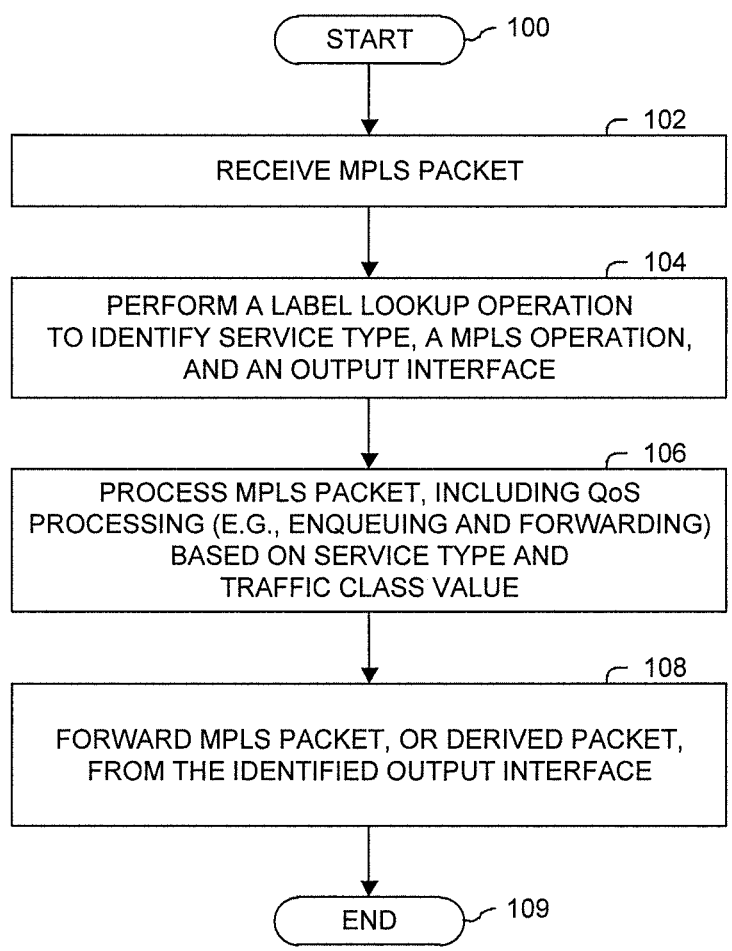
FIG. 1 illustrates a process according to one embodiment.

Disclosed are, inter alia, methods, apparatus, computer-storage media, mechanisms, and means associated with expanded quality of service processing of Multiprotocol Label Switching (MPLS) packets.

In one embodiment, a packet switching device determines a service type based on a label of a Multiprotocol Label Switched (MPLS) packet. A Quality of Service (QoS) classification value is determined from the service type and a Traffic Class (TC) value of the MPLS packet. The MPLS packet is processed based on said determined QoS classification value.

In one embodiment, a packet switching device determines a service type based on a label of a Multiprotocol Label Switched (MPLS) packet. A Traffic Class (TC) value is extracted from the label of the MPLS packet. The packet switching device provides Quality of Service (QoS) processing of the MPLS packet based on the service type and the TC value. In one embodiment, the service type is determined based on a forwarding equivalence class (FEC) identified based on the label of the MPLS packet.

In one embodiment, the service type corresponds to a service offering of a provider operating the packet switching device.

In one embodiment, determining the service type includes retrieving the service type from a label forwarding information base (LFIB) by the packet switching device based on the label. In one embodiment, the TC value is extracted from a three-bit field in the label. In one embodiment, said processing of the MPLS packet based on said determined QoS classification value includes processing according to a QoS action identified by a lookup operation in a QoS table based on the QoS classification value. In one embodiment, the QoS action identifies a queue in which to place the MPLS packet. In one embodiment, the queue corresponds to one of eight queues associated with the service type.

In one embodiment, determining the service type includes performing a lookup operation, based on the label, in a label forwarding information base (LFIB) in the packet switching device resulting in the identification of the service type, an MPLS operation, and an output interface of the packet switching device; and wherein said processing includes processing the MPLS packet based on the MPLS operation and said determined QoS classification value, and forwarding from the output interface the MPLS packet or a packet derived from the MPLS packet. In one embodiment, the TC value is extracted from a three-bit field in the label. In one embodiment, processing of the MPLS packet based on said determined QoS classification value includes processing according to a QoS action identified by a lookup operation in a QoS table based on the QoS classification value. In one embodiment, the QoS action identifies a queue in which to place the MPLS packet. In one embodiment, the queue corresponds to one of eight queues associated with the service type.

2. Description

Disclosed are, inter alia, methods, apparatus, computer-storage media, mechanisms, and means associated with expanded quality of service processing of Multiprotocol Label Switching (MPLS) packets.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

FIG. 1 illustrates a process according to one embodiment performing expanded QoS processing (e.g., according to a corresponding QoS policy) of MPLS packets. Processing begins with process block 100. In process block 102, a MPLS packet is received. The MPLS packet includes one or more MPLS labels for using in processing (e.g., manipulating, forwarding) of the received MPLS packet. In process block 104, a label lookup operation is performed in a label forwarding information base (LFIB) based on a label (e.g., the entire label or a portion thereof possibly with other information) of the received MPLS packet. Typically, the label at the top of the label stack of the received MPLS packet is used as the lookup value. In other words, the lookup operation identifies processing to be performed on the packet based on the forwarding equivalence class (FEC) associated with the MPLS packet, as typically identified based on the label of the MPLS packet. In one embodiment, the result of the lookup operation includes the service type, a MPLS operation, and an output interface (which are typically the same for all MPLS packets associated with a same FEC). In one embodiment, the label includes the TC value.

In process block 106, the MPLS packet is processed. The identified MPLS operation is typically a label pop, swap, or push operation. The MPLS operation and QoS processing is performed. The QoS processing typically includes enqueuing the MPLS packet (or possibly a packet extracted from the MPLS packet) in a queue corresponding to the appropriate QoS processing to be performed based on the identified service type and Traffic Class (TC) value extracted from a label of the MPLS packet. In one embodiment, a QoS classification value is determined from the service type and TC value for use in determining the QoS processing to be performed. In one embodiment, this QoS classification value and/or the identified service type and TC value are carried with the MPLS packet through the packet switching device, possibly in an internal header or other meta data. Examples of this QoS processing include, but are not limited to, scheduling, packet prioritization, reserved bandwidth forwarding, and/or other processing of the packet. In one embodiment, an access control list is used to identify the QoS processing to be performed based on a matching of the service type, TC value, and/or QoS classification value. In one embodiment, out-of-bandwidth signaling is used to identify the QoS processing. Basing the QoS processing on an identified service type allows more than eight behavior aggregates which could be identified by a three-bit TC value, as well as allowing differentiated QoS processing based on the identified service type.

In process block 108, the MPLS packet, or a packet derived therefrom (e.g., a decapsulated Internet Protocol packet) is sent from the identified output interface of the packet switching device. Processing of the flow diagram of FIG. 1 is complete as indicated by process block 109.

Figure 2A:
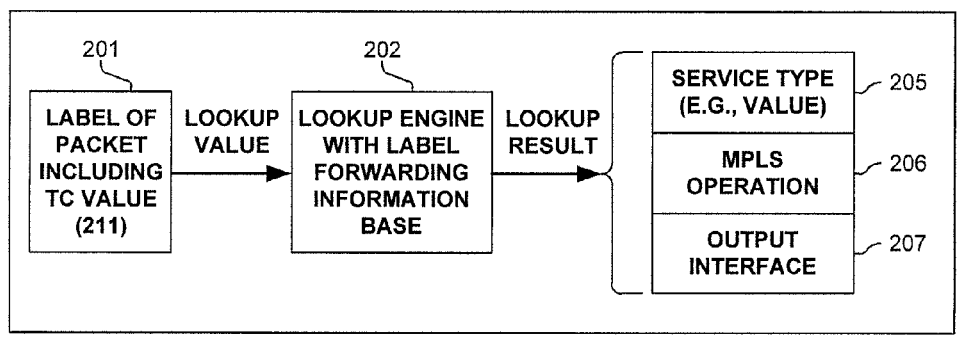
FIG. 2A illustrates determining a service type of a MPLS packet according to one embodiment.

FIG. 2A illustrates determining a service type associated with a MPLS packet according to one embodiment. As shown, label 201 of a received MPLS packet is used as a lookup value by lookup engine (202) in a label forwarding information base (LFIB) to identify the lookup results of service type 205, MPLS operation 206, and output interface 207. In one embodiment, label 201 includes TC value 211. In one embodiment TC value 211 is included in a different label of the MPLS packet.

Figure 2B:
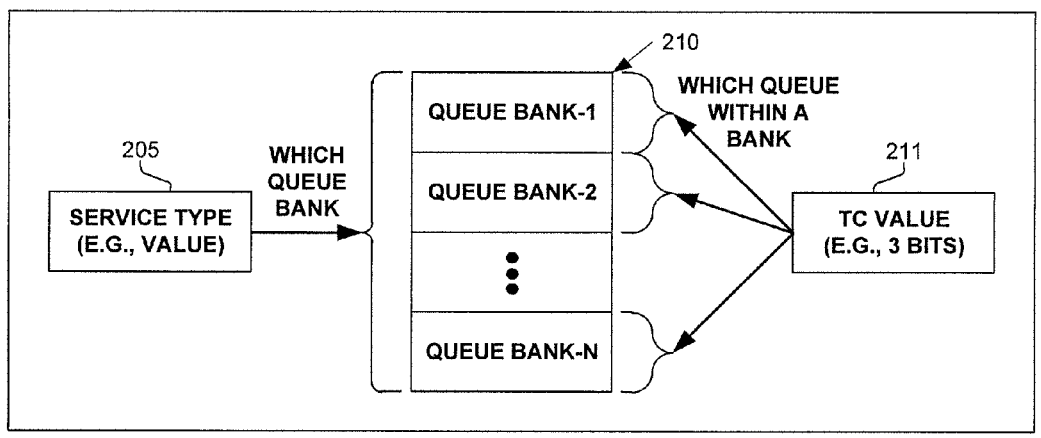
FIG. 2B illustrates determining a queue in which to enqueue a MPLS packet according to one embodiment.

FIG. 2B illustrates determining a queue in which to enqueue a MPLS packet according to one embodiment. Service type 205 is used to determine which of multiple banks of a plurality of queues (e.g., which of the plurality of the plurality of queues), and TC value 211 is used determine a particular queue within the bank of the plurality of queues identified by service type 205. In one embodiment, each bank of a plurality of queues (210) includes eight queues.

Figure 2C:
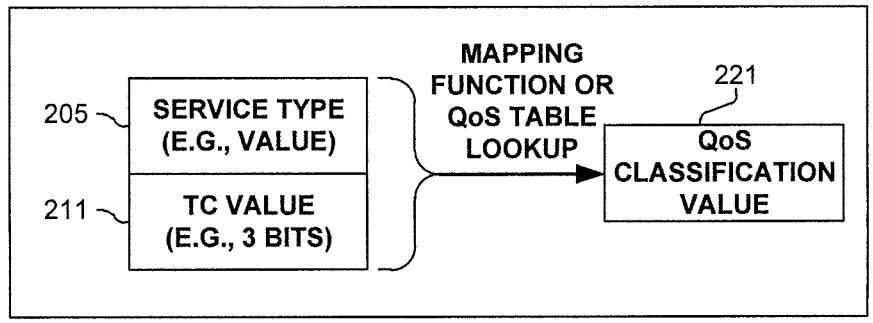
FIG. 2C illustrates determining a Quality of Service (QoS) classification value according to one embodiment.

FIG. 2C illustrates determining a Quality of Service (QoS) classification value according to one embodiment. In one embodiment, service type 205 and TC value 211 are mapped in some manner (e.g., concatenated, hashed, used as a lookup value in a QoS lookup table, or otherwise manipulated) to identify QoS classification value 221. Therefore, QoS classification value 221 is derived based on service type 205 and TC value 211. QoS classification value 221 is used to identify QoS processing to be performed on a corresponding packet.

Figure 2D:
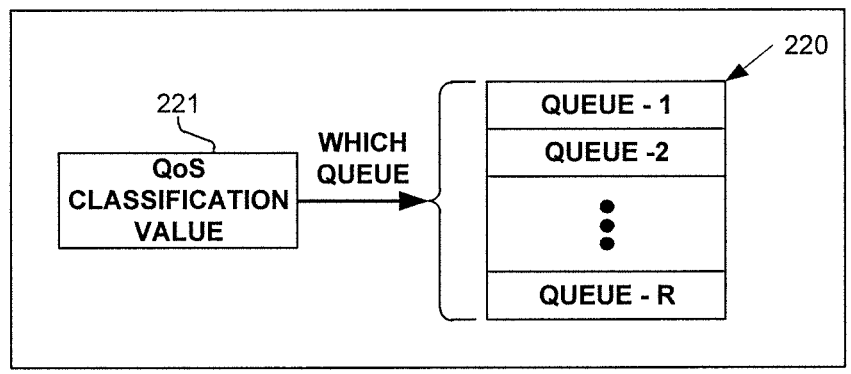
FIG. 2D illustrates determining a queue in which to enqueue a MPLS packet according to one embodiment.

FIG. 2D illustrates determining a queue in which to enqueue a MPLS packet according to one embodiment. As shown, QoS classification value 221 is used directly, or possibly based thereon in some manner, to identify which of queues 220 to enqueue for subsequent processing according to a corresponding QoS definition.

Figure 2E:
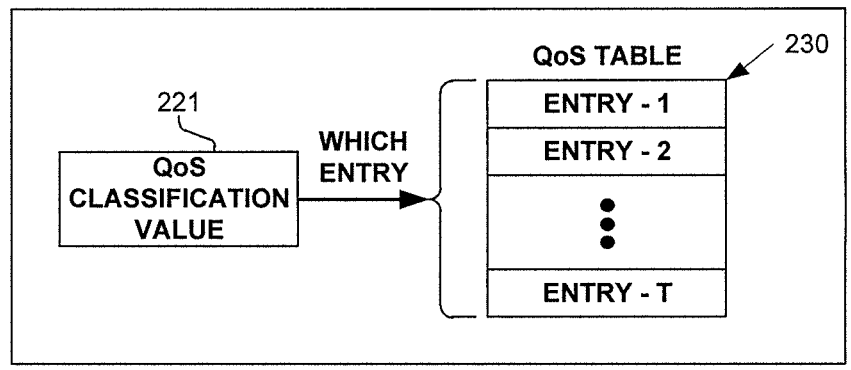
FIG. 2E illustrates determining QoS processing to be performed according to one embodiment.

FIG. 2E illustrates determining a queue in which to enqueue a MPLS packet according to one embodiment. QoS table 230 includes multiple entries, each of which identify QoS processing to be performed. In one embodiment, QoS classification value 221 is used directly, or possibly based thereon in some manner, to identify which entry from QoS table 230 to retrieve in order to identify the corresponding QoS processing to be performed on the packet.

Figure 3A:
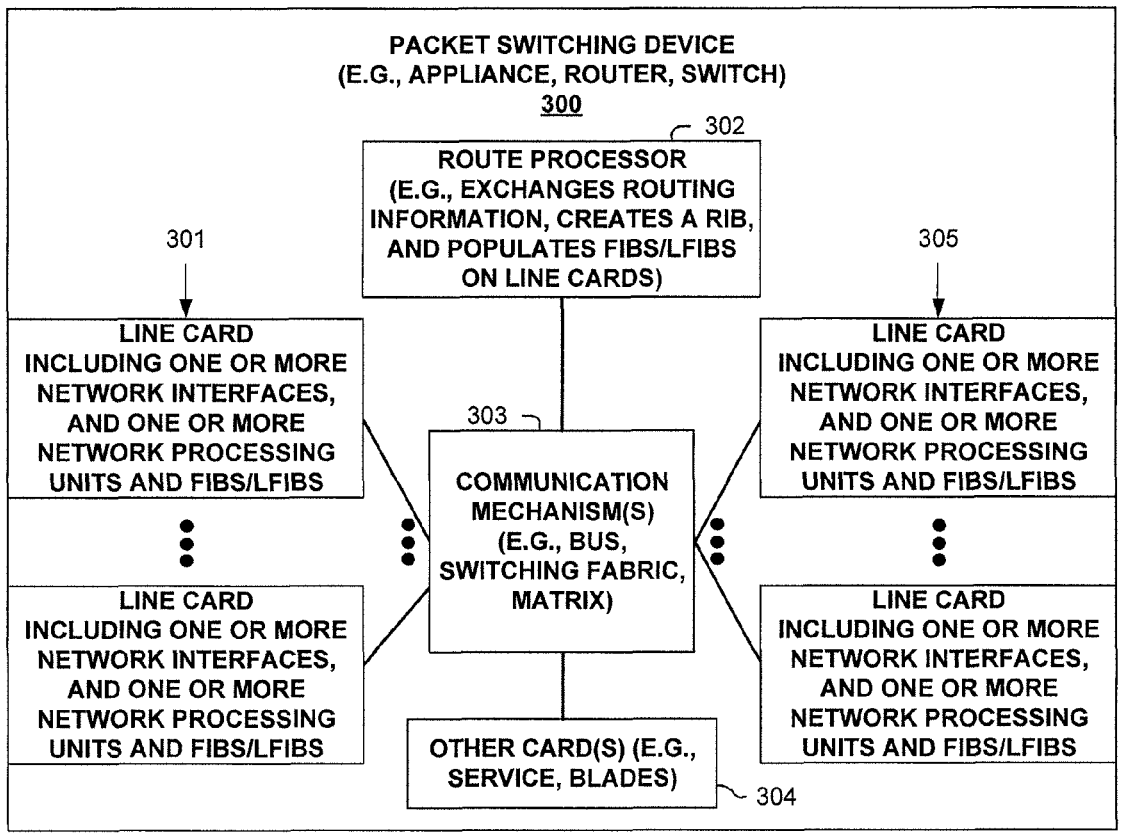
FIG. 3A illustrates a packet switching device according to one embodiment.

One embodiment of packet switching device 300 (e.g., appliance, router) is illustrated in FIG. 3A. As shown, packet switching device 300 includes multiple line cards 301 and 305, each with one or more network interfaces for termination communications links (e.g., possibly part of a multichassis bundle), one or more network processing units and FIBs/LFIBs for use in forwarding packets. Additionally, packet switching device 300 also has a route processor 302, which typically manages the control plane by communicating routing information with other packet switching devices, populates one or more RIBs and/or label information bases, and populates one or more FIBs/LFIBs in line cards 301 and 305. Packet switching device 300 also includes other cards 304 (e.g., service cards, blades), and some communication mechanism 303 (e.g., bus, switching fabric, matrix) for allowing its different entities 301, 302, 304 and 305 to communicate. Note, as used herein, a network processing unit refers to a network processor and memory for use in processing (e.g., including QoS processing and/or forwarding) of packets. A line card can have a single network processing unit, or may have multiple network processing units.

Figure 3B:
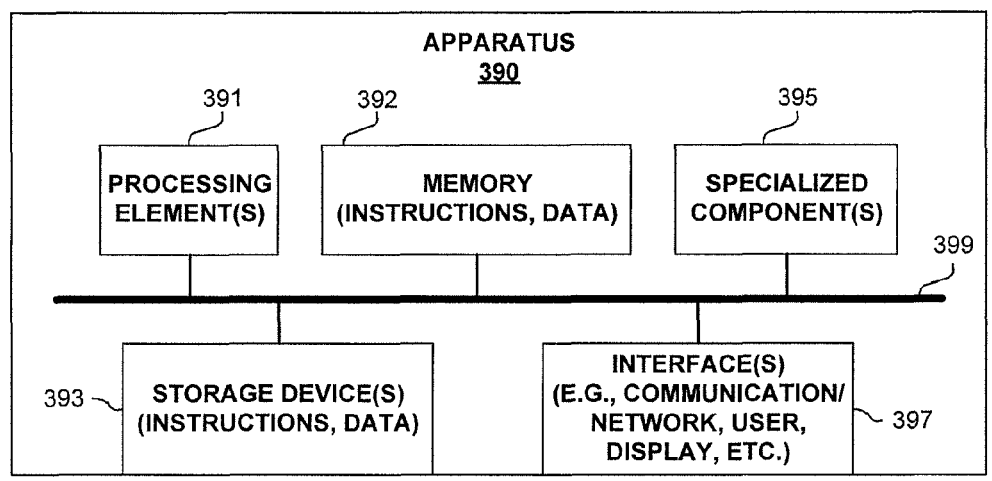
FIG. 3B illustrates an apparatus according to one embodiment.

FIG. 3B is a block diagram of an apparatus 390 used in one embodiment associated with expanded quality of service processing of Multiprotocol Label Switching (MPLS) packets. In one embodiment, apparatus 390 performs one or more processes corresponding to one of the flow diagrams illustrated or otherwise described herein, and/or illustrated in another diagram or otherwise described herein.

In one embodiment, apparatus 390 includes one or more processing element(s) 391, memory 392, storage device(s) 393, specialized component(s) 395 (e.g. optimized hardware such as for performing lookup and/or QoS processing operations, etc.), and interface(s) 397 for communicating information (e.g., sending and receiving packets over links of a multichassis bundle, user-interfaces, displaying information, etc.), which are typically communicatively coupled via one or more communications mechanisms 399, with the communications paths typically tailored to meet the needs of a particular application.

Various embodiments of apparatus 390 may include more or fewer elements. The operation of apparatus 390 is typically controlled by processing element(s) 391 using memory 392 and storage device(s) 393 to perform one or more tasks or processes. Memory 392 is one type of computer-readable/computer-storage medium, and typically comprises random access memory (RAM), read only memory (ROM), flash memory, integrated circuits, and/or other memory components. Memory 392 typically stores computer-executable instructions to be executed by processing element(s) 391 and/or data which is manipulated by processing element(s) 391 for implementing functionality in accordance with an embodiment. Storage device(s) 393 are another type of computer-readable medium, and typically comprise solid state storage media, disk drives, diskettes, networked services, tape drives, and other storage devices. Storage device(s) 393 typically store computer-executable instructions to be executed by processing element(s) 391 and/or data which is manipulated by processing element(s) 391 for implementing functionality in accordance with an embodiment.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
receiving a Multiprotocol Label Switched (MPLS) packet;
determining a service type based on a label of the MPLS packet, with the label associated with a particular forwarding equivalence class (FEC), and with said determining the service type including performing a lookup operation, based on the label, in a label forwarding information base (LFIB) in a packet switching device resulting in a lookup result including the identification of the service type and forwarding information, with the service type corresponding to a service offering of a provider operating the packet switching device;
extracting a Traffic Class (TC) value from a TC field of the MPLS packet;
determining a Quality of Service (QoS) classification value from the service type and the TC value;
QoS processing, by the packet switching device, the MPLS packet based on said determined QoS classification value, including QoS processing according to a QoS action identified by the lookup operation in a QoS table based on the QoS classification value; and
forwarding the MPLS packet, or a packet derived therefrom, from the packet switching device according to said forwarding information.

2. The method of claim 1, wherein the QoS action identifies a queue in which to place the MPLS packet.

3. The method of claim 2, wherein the queue corresponds to one of eight queues associated with the service type and which said one of the eight queues is identified by the TC value.

4. The method of claim 1, wherein the lookup result also includes an MPLS operation, and an output interface of the packet switching device; and
wherein said QoS processing includes processing the MPLS packet based on the MPLS operation and said determined QoS classification value, and forwarding from the output interface the MPLS packet or a packet derived from the MPLS packet.

5. The method of claim 4, wherein the TC value is extracted from a three-bit field in the label.

6. The method of claim 5, wherein the QoS action identifies a queue in which to place the MPLS packet.

7. The method of claim 6, wherein the queue corresponds to one of eight queues associated with the service type and which said one of the eight queues is identified by the TC value.

8. A packet switching device, comprising:
a plurality of interfaces configured to send and receive packets;
one or more network processing units; and
one or more packet switching mechanisms configured to packet switch packets among said interfaces;

wherein the packet switching device is configured to perform operations, including:

determining a service type based on a label of a Multiprotocol Label Switched (MPLS) packet received by the packet switching device on one of the plurality of interfaces, with the label associated with a particular forwarding equivalence class (FEC), and with said determining the service type including performing a lookup operation, based on the label, in a label forwarding information base (LFIB) in a packet switching device resulting in a lookup result including the identification of the service type and forwarding information, with the service type corresponding to a service offering of a provider operating the packet switching device;

extracting a Traffic Class (TC) value from the label of the MPLS packet;

determining a Quality of Service (QoS) classification value based on the service type and the TC value;

Quality of Service (QoS) processing, by the packet switching device, the MPLS packet based on said determined QoS classification value, including QoS processing according to a QoS action identified by the lookup operation in a QoS table based on the QoS classification value; and forwarding the MPLS packet, or a packet derived therefrom, from the packet switching device according to said forwarding information.

9. The packet switching device of claim 8, comprising a plurality of different plurality of queues; wherein each different service type is associated with one of the different plurality of queues; and wherein said Quality of Service (QoS) processing includes enqueuing the MPLS packet in a particular queue of a particular plurality of queues of the different plurality of queues associated with the service type; wherein the particular queue is identified within the plurality of queues based on the TC value.

* * * * *